May 24, 1960
L. R. SHANK
2,937,765
SLIDING SHELF STRUCTURE
Filed April 18, 1958
2 Sheets-Sheet 1
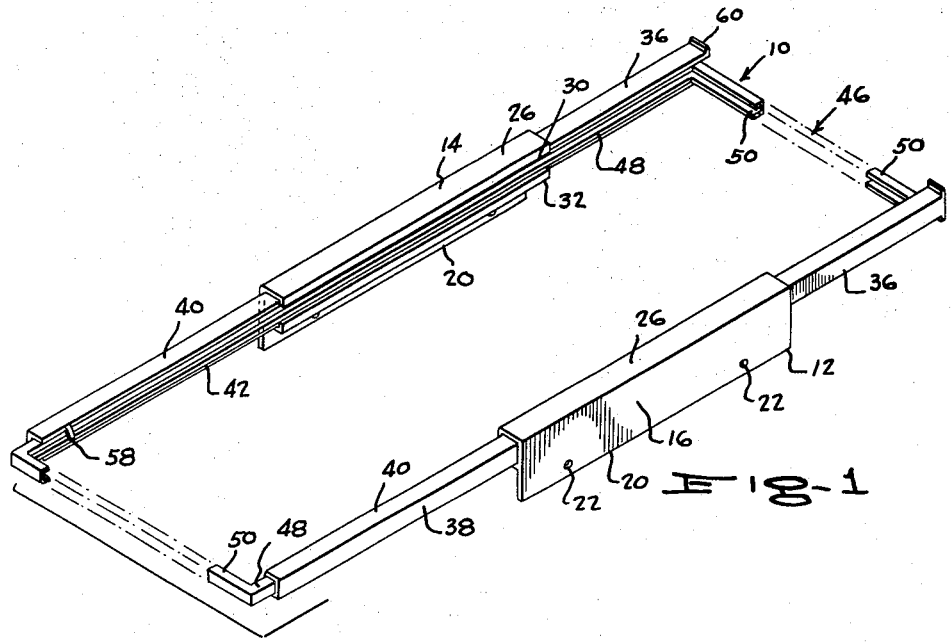
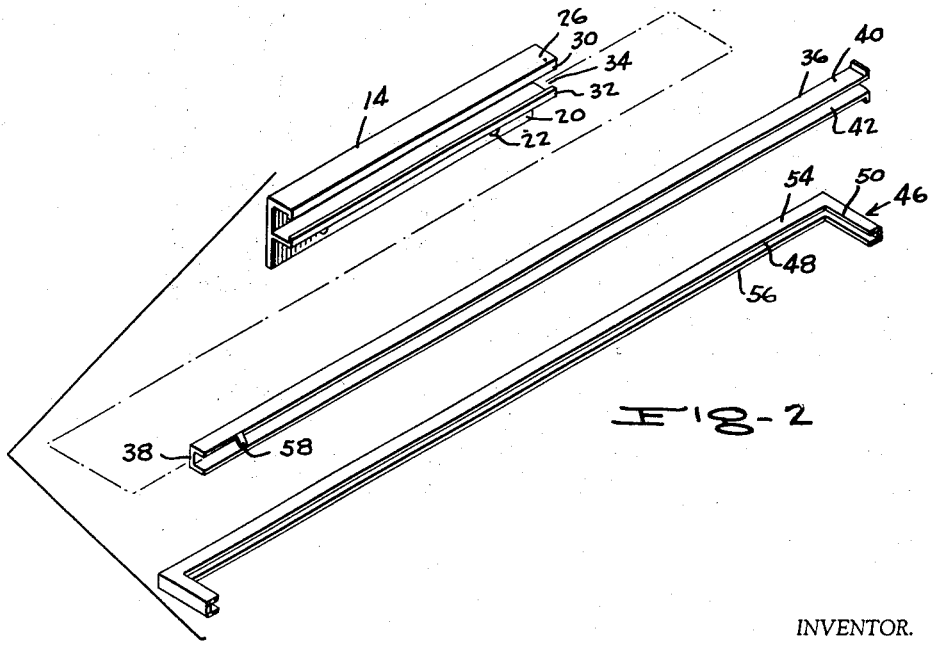
INVENTOR.
LELAND R. SHANK
BY
McMorrow, Berman + Davidson
ATTORNEYS

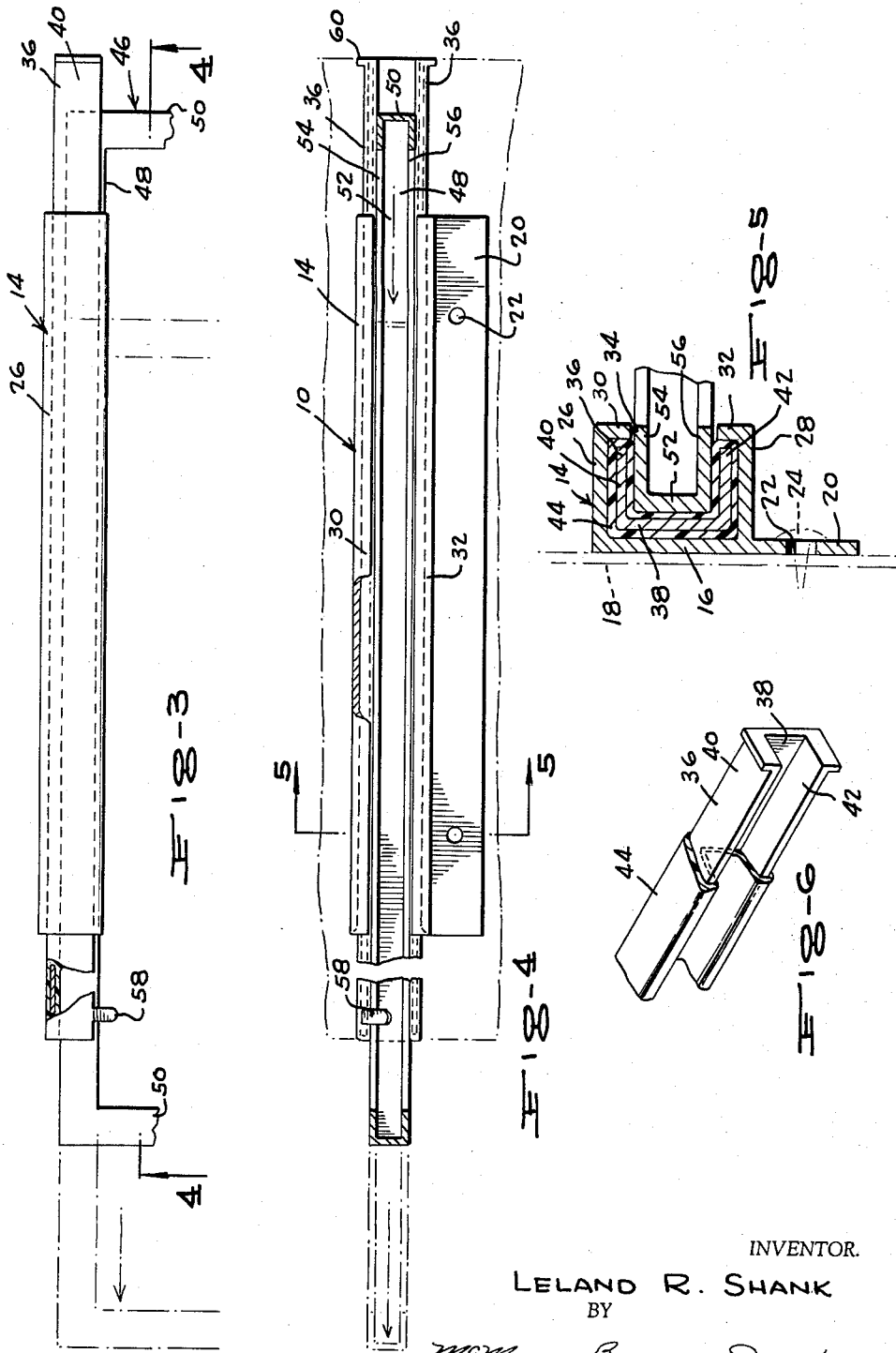

United States Patent Office 2,937,765
Patented May 24, 1960

2,937,765

SLIDING SHELF STRUCTURE

Leland R. Shank, 513 S. Wayne St., P.O. Box 46, Angola, Ind.

Filed Apr. 18, 1958, Ser. No. 729,469

2 Claims. (Cl. 211—143)

The present invention relates to improvements in shelf constructions and particularly relates to an improved sliding shelf structure which can be used in any desired environment and which is constructed so as to be unaffected by any conditions, such as, temperature, wear or the like.

A primary object of the present invention is to provide a sliding, suspension shelf construction wherein the shelf has side rails that slide in suspension rails which are slidably mounted in rigid supports, the sides of the shelf and the suspension rails being provided with a bearing means which permits ready and easy sliding, relative movement.

Another important object of the present invention is to provide a sliding, suspension or extension shelf structure, wherein the side members of a shelf are slidably mounted in suspension rails that are slidably disposed in fixed rails or guides, the suspension rails being enclosed or covered on their sliding or bearing surfaces, relative to the fixed rails or guides and to the side members of the shelf, by a nylon covering, which constitutes a bearing means.

More particularly, the present invention comprehends the provision of fixed guides or rails, which are extruded from aluminum, and the provision of suspension rails, which are also extruded from aluminum, and which are slidably disposed in the fixed guides or rails, and the provision of a shelf, which has side members that are likewise extruded from aluminum, the suspension rails being enclosed or covered by a nylon bearing, which is fabricated from nylon material, so as to provide a bearing means for the side members of the shelf in their sliding movement relative to the suspension rails, as well as to provide a bearing means for the sliding movement of the suspension rails relative to the fixed rails or guides.

It is within the comprehension of the present invention to provide a very compact and sturdy shelf structure which is preferably formed from extruded aluminum, with regard to the side members of the shelf, the suspension rails and the fixed guides or rails, and to provide a nylon fabricated bearing, which covers the suspension rails, that slidably support the side members of the shelf structure and which are themselves slidably related to the fixed supports or rails. Thus, the shelf structure envisions the sliding movement of the shelf relative to the suspension rails and, in the final movement of the shelf relative to the suspension rails, the then sliding movement of the suspension rails relative to the fixed rails or guides, whereby a sliding, suspension shelf rail assembly is provided.

The foregoing and ancillary objects, including the provision of an inexpensive, compact and extremely efficient shelf structure, are attained by this invention, the preferred embodiment of which is set forth in the following description and illustrated in the accompanying drawings, wherein:

Figure 1 is a view in perspective of the shelf structure, illustrating in detail the fixed guides or rails, which are adapted to be attached to the side walls of a cabinet, refrigerator or the like, and the suspension rails which are slidably disposed in the fixed guides or rails and the shelf, which is slidably carried by the suspension rails;

Figure 2 is an exploded perspective view of one of the fixed guides or rails and one of the suspension rails and one of the side members of the shelf, showing the same in unassembled relationship;

Figure 3 is a top plan view, partly in section, of one side of the shelf structure, as provided by the present invention;

Figure 4 is a longitudinal vertical sectional view, taken on line 4—4 of Figure 3;

Figure 5 is a transverse sectional view taken on line 5—5 of Figure 4; and,

Figure 6 is a fragmentary, detailed sectional view of the end portion of one of the suspension rails, showing the nylon extrusion bearing, which encompasses the sliding and slidable surfaces of the suspension rail.

Referring now more particularly to the accompanying drawings, the reference numeral 10 generally designates the shelf construction, which includes two fixed guides or rails 12 and 14, each of which is identically constructed.

As shown more particularly in Figure 5, the fixed guide or rail 14 includes a side wall 16, which is positioned flat against a supporting wall 18 that may be the side wall of a refrigerator, cabinet or the like, depending upon the particular environment for the shelf structure 10. The side wall 16 is formed with an integral, extending mounting flange 20, that is disposed coplanar thereto, and which is provided with openings 22 for the reception of fasteners 24 for securing the guide or rail 14 to the side wall 18. The fixed guide or rail 14 further includes parallel upper and lower walls 26 and 28 which are provided at their outer ends with lateral flanges 30 and 32, that have free edges disposed in confronting relationship so as to provide a slot or opening 34.

In essence, the fixed guides or rails 12 and 14 are channel shaped in cross-section, with the parallel walls 26 and 28 being formed with flanges 30 and 32, that are laterally projected therefrom and disposed in spaced confronting relationship. The mounting flange 20 is disposed coplanar to the wall 16 and is provided to enable the fixed guides or rails 12 and 14 to be easily secured on the walls of a particular structure, such as a refrigerator, cabinet or the like.

Suspension rails 36 are slidably disposed within the fixed guides or rails 12 and 14 and are U-shaped in cross-section, thus presenting web portions 38 and leg portions 40 and 42. The suspension rails 36 have their web portions 38 and leg portions 40 and 42 completely encased or enclosed with a nylon covering 44.

A shelf 46 is slidably disposed within the suspension rails and consists of side members 48 and end members 50, which interconnect the side members. The side members are further interconnected by cross-bars, which are not shown, inasmuch as the specific shelf structure, per se, constitutes no part of the present invention.

The side members 48 of the shelf are channel shaped in cross-section, thus presenting a web portion 52 and upper and lower side portions 54 and 56.

It is to be particularly noted, with regard to Figure 5, that the side members 48 of the shelf 46 slide within the suspension rails 36 but are bearing on the innermost, channel like portion of the nylon covering 44.

The upper leg portion 40 of the suspension rails 36 are formed, adjacent their outer most ends, with stops 58, which are disposed in an inclined plane so as to be abutted by the end members 50 of the shelf structure 46. Thus, when the shelf structure 46 is pulled outwardly, the inner most end member will abut the stops 58 so as to cause the suspension rails 36 to be moved outwardly in the fixed guides or rails 12 and 14. The stops 58 are formed integral with the suspension rails and, thus, possess an inherent resiliency so as to be capable of being flexed upwardly to permit the shelf structure 46 to be removed therefrom.

The suspension rails 36 are provided at their inner ends with lateral flanges 60 which constitute stops, limiting the outward sliding movement of the suspension rails relative to the fixed guides or rails 12 and 14.

In the assembled relationship, it is to be particularly noted that the fixed guides or rails 12 or 14 are constructed so as to be mounted in a fixed relationship on the inner surfaces of the walls of a refrigerator, cabinet or the like. The mounting flanges 20 of the fixed guides or rails 12 and 14 are formed with the apertures 22 to receive the screws or suitable fasteners 24, whereby the fixed guides or rails are mounted in place, assuming a parallel relationship. The suspension rails 36 are slidably disposed within the fixed guides or rails 12 and 14 and, as a very particular feature of the present invention, the suspension rails are covered or encompassed with the nylon covering 44. Thus, the outer surfaces of the suspension rails are completely enclosed or covered by the nylon covering 44, so as to permit a very easy and unaffected sliding movement of the suspension rails relative to the fixed guides or rails 12 and 14. The side members of the shelf 46 are mounted within the channel shaped suspension rails 36, which have their inner surfaces enclosed or covered by the nylon covering 44 that defines an efficient bearing means.

In use, the shelf 46 can be easily and readily moved within the suspension rails 36. When the inner end member 50 of the shelf abuts the stops 58, further outward movement of the shelf will result in a sliding movement of the suspension rails 36, which slide within the fixed guides or rails 12 and 14, until the stops or abutments 60, which are constituted by flanges on the inner ends of the upper and lower walls of the suspension rails, abut the inner ends of the fixed guides or rails 12 and 14. This will prevent further axial movement of the suspension rails.

It is to be particularly noted that the suspension rails have their inner and outer surfaces, the suspension rails being channel shaped in cross-section, completely enclosed or covered by the nylon fabricated covering 44, so that the shelf 46 slides with its side members bearing on the nylon bearing covering and so that the suspension rails themselves slide, with their associated nylon bearing covering, in the fixed guides or rails 12 and 14. This permits the easy and ready movement of the shelf 46 to its outer most position, as well as accommodating the movement of the suspension or extension rails, whereby a further, axial displacement of the shelf is obtained.

It is an important feature of the present invention that the suspension or extension rails 36 are formed in a manner to accommodate the movement of the side members of the shelf and then to move themselves relative to the fixed guides or rails, with both movements being provided for, respective to the ease and freedom thereof, by the bearing surface, which is provided by the nylon covering 44, that may be suitably formed, as by being poured in powdered form on the aluminum rails, when they are heated, or by extruding the bearing covering from nylon stock and then positioning it on the rails.

It is within the scope of the present invention that the fixed rails or guides 12 and 14 are extruded from aluminum and that the extension or suspension rails 36 are likewise extruded from aluminum, as are the side members 48 of the shelf 46. Also, ancillary to this, is the provision of the bearing means 44, which is extruded from nylon and which is formed in a manner to enclose the outer and inner surfaces of the channel like suspension or extension rails 36.

Having thus described this invention, what is claimed is:

1. A shelf structure comprising spaced apart, parallel rails disposed in a fixed relationship and of a channel-shape cross-section, channel shaped suspension rails slidably mounted in the fixed rails and movable longitudinally relative thereto, said suspension rails having web portions and lateral leg sections and said fixed rails having web portions confronting the web portions of the suspension rails and having lateral leg sections confronting the leg sections of the suspension rails, nylon bearing sleeves of channel shaped cross-section sleeved over the suspension rails and covering the inner and outer faces of the web portions and leg sections thereof, said bearing sleeves being in sliding contact with the inner faces of the web portions and leg sections of the fixed rails, and a shelf having members slidably mounted within the leg sections of the suspension rails and bearing on the nylon sleeves at the web portion and leg sections of the suspension rails.

2. A shelf structure comprising spaced apart, parallel rails disposed in a fixed relationship and of a channel-shape cross-section, channel shaped suspension rails slidably mounted in the fixed rails and movable longitudinally relative thereto, said suspension rails having web portions and lateral leg sections and said fixed rails having web portions confronting the web portions of the suspension rails and having lateral leg sections confronting the leg sections of the suspension rails, nylon bearing sleeves of channel shaped cross-section sleeved over the suspension rails and covering the inner and outer faces of the web portions and leg sections thereof, said bearing sleeves being in sliding contact with the inner faces of the web portions and leg sections of the fixed rails, and a shelf having members slidably mounted within the leg sections of the suspension rails and bearing on the nylon sleeves at the web portion and leg sections of the suspension rails, said leg sections of the fixed rails having free edges, coplanar, spaced apart lateral flanges on said free edges, said flanges overlying the free edges of the leg sections of the suspension rails and defining a mouth for the members of the shelf and defining retaining means for the suspension rails, said mouth being of less dimension in a plane perpendicular to the shelf than the portions of the bearing sleeve overlying the inner faces of the leg sections of the suspension rails so that the members of the shelf are out of engagement with the flanges and slide on the surfaces of the bearing sleeve.

References Cited in the file of this patent

UNITED STATES PATENTS

| 810,909 | McMillan | Jan. 30, 1906 |
|---|---|---|
| 1,301,495 | Otte | April 22, 1919 |
| 2,086,047 | Rand | July 6, 1937 |
| 2,098,198 | Sindelar | Nov. 2, 1937 |
| 2,597,976 | Cousins | May 27, 1952 |
| 2,750,052 | Brown | June 12, 1956 |
| 2,757,051 | Wilmer | July 31, 1956 |
| 2,815,252 | Baker | Dec. 3, 1957 |
| 2,822,231 | Golz | Feb. 4, 1958 |
| 2,835,539 | Conrad | May 20, 1958 |

FOREIGN PATENTS

| 653,032 | Germany | Nov. 12, 1937 |
|---|---|---|